E. & E. G. SIRRET.

Assignors by Mesne Assignments to CLARK & CO.

MOP-HEAD.

No. 7,398. Reissued Nov. 21, 1876.

Fig. 1.

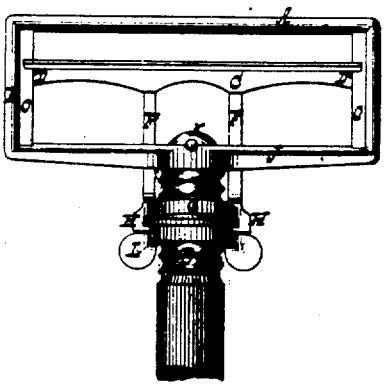

Fig. 2.

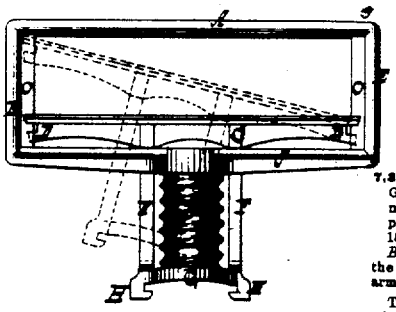

7,398. MOP-HEADS. Emile Sirret and Emile G. Sirret, Buffalo, N. Y., assignors, by mesne assignments, to Clark & Co., same place. Patent No. 88,917, dated Apr. 13, 1869. [Filed Sept. 26, 1876.]

*Brief.*—The movable jaw is connected to the operating-nut by means of two grasping-arms.

The open stationary frame, forming a part of the threaded socket which receives the handle, in combination with the movable jaw or cross-head and a ring-nut arranged on the screw-socket of the open stationary frame, for operating the movable jaw and adapting the latter to come in contact with the upper part of the open fixed frame, for clamping a mop, substantially as described.

Fig. 3.

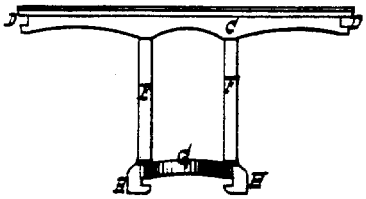

Fig. 4.

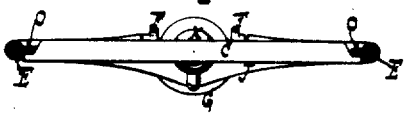

Witnesses.

Otto Hufeland

Hugo Bruggemann

Inventors

Emile Sirret

Emile George Sirret by

Van Santvoord & Hauff their attorneys

THE GRAPHIC CO. N.Y.

UNITED STATES PATENT OFFICE.

EMILE SIRRET AND EMILE G. SIRRET, OF BUFFALO, NEW YORK, ASSIGNORS, BY MESNE ASSIGNMENTS, TO CLARK & CO., OF SAME PLACE.

IMPROVEMENT IN MOP-HEADS.

Specification forming part of Letters Patent No. 88,917, dated April 13, 1869; reissue No. 7,398, dated November 21, 1876; application filed September 26, 1876.

*To all whom it may concern:*

Be it known that we, EMILE SIRRET and EMILE GEORGE SIRRET, both of Buffalo, in the county of Erie and State of New York, have invented a new and useful Improvement in Mop-Heads, which improvement is fully set forth in the following specification, reference being had to the accompanying drawing, in which—

Figure 1 represents a face view or elevation of our mop-head. Fig. 2 is the binder-frame of the mop-head, in which is shown the manner of introducing the cross-head and bridle into the frame. Fig. 3 shows the cross-head and bridle detached. Fig. 4 is a section in the line *x x* of Fig. 1.

Similar letters indicate corresponding parts.

This invention consists in a mop-head consisting of an open stationary frame, forming a part of the threaded socket which receives the handle, in combination with the movable jaw or cross-head, and a ring-nut arranged on the screw-socket, for operating the movable jaw, as will be hereinafter described.

We construct our mop-head in any of the shapes known with screw and thumb-nut, as used in many of the iron mop-heads; but in order to obviate the inconvenience of wire-winding, boring, and riveting, in making the binder, we cast the binder-frame or outer jaw and screw-threaded hollow shank B (with a socket or hole therein for the handle) whole in one piece, so that the binder-frame or outer jaw is rigidly connected with the screw-shank, and forms the fixed or stationary jaw of the mop-head. A thumb-nut, L, is placed on the screw-threaded shank B, and is arranged to work loosely thereon. The nut, instead of moving the binder or outer jaw of the mop-head, and bringing it to press against the cross-head, as is commonly done on other mop-heads, is arranged so as to have the contrary action, the cross-head (shown detached in Fig. 3) being operated by the thumb-nut working on the threaded shank B, and being made to press the mop against the outer part of jaw A, which is made with an open frame for the purpose of receiving and holding therein the mop or mop fabric, the frame of said outer jaw consisting, with the jaw proper, A, of the inner jaw J and connecting-bars E E, the jaw A and its frame being cast in one piece with the screw-threaded shank B, the jaw A being thus made stationary and rigid with the hollow screw-shank B. The cross-head is composed of a cross-bar, C, two arms, F F, which project from its lower side, and a bridle or collar, G, and is represented detached in Fig. 3. The ends of the cross-bar are notched, as at D, seen most clearly in Fig. 4, to allow the notched ends to fit and slide upon guides *o* formed on the inner edges of the end bars E of the stationary frame.

The mop-head is cast or made in three pieces, namely: the stationary binder-frame, comprising the outer jaw A, and the bars E E, and J, and threaded shank B, the cross-head comprising the cross-bar C, arms F F, and bridle or collar G, and, lastly, the operating-nut L. The bridle or collar G, as here shown, is semicylindrical, and is arranged on the cross-head so as to move along that side of the screw-shank which is opposite to the side along which the connecting-arms F F extend, whereby, in connection with the notched cross-bar which engages the guides O of the binder-frame, the cross-head is prevented from becoming detached from the frame of the stationary jaw A, and is only allowed to move toward and away from the jaw A under the operation of the thumb-nut. The bridle or collar G is provided with notched projections H H on its opposite sides, so arranged as to embrace a flange, I, on the outside of the nut L, and by that means the nut and bridle are connected to each other. We make the connecting-arms F F of such a length with reference to the length of the shank B, as to allow the bridle or collar G to swing over the end of the shank when the cross-bar C lies close to the bar J of the frame.

In order to place the cross-head in the frame (the handle K being out of the socket of the shank) the cross-bar C is inserted in the frame in the position shown in dotted lines in Fig. 2, so that its notched ends engage the guides O when the cross-bar is brought close against the bar J, and the bridle or collar is swung or sprung over the end of the shank. The bridle or collar G, whether it is semicircular or a completed circle, is so made and arranged that it will slide over the surface of the thread of the shank. When the bridle is semicircular it is so arranged on the arms F F that its place on the shank is on the side opposite to that along which the arms F extend. The cross-head, after being united to the binder-frame in the manner described, is held united to it, as shown in Fig. 1, at one part by the guides O O, which enter the notches D D of the cross-bar, and at another by the arms F F and bridle or collar G. The bar J and shank B of the frame are between the arms F and bridle G, the arms F F moving over or past the bar J on one side of the axis of the shank while the bridle or collar G moves over or past the shank on the other side of its axis. The thumb-screw nut is caused to engage with the notched projections H of the bridle or collar by bringing the bridle even with the end of the shank, so that the projections will extend beyond the end of the shank, and enable the nut to be passed between them, its flange I entering the notches of the projections, as shown in Fig. 1. The handle is then run through the nut and shank, its end K extending past the bar J, so as to serve as a stop to prevent the nut from being unscrewed off the shank onto the handle, and also to enable one to secure the handle by inserting a nail through the end K above the edge of the bar J, and thereby save the necessity of making a hole through the shank for that purpose.

What we claim as new, and desire to secure by Letters Patent, is—

The open stationary frame, forming a part of the threaded socket which receives the handle, in combination with the movable jaw or cross-head and a ring-nut arranged on the screw-socket of the open stationary frame, for operating the movable jaw and adapting the latter to come in contact with the upper part of the open fixed frame, for clamping a mop, substantially as described.

In testimony that we claim the foregoing we have hereunto set our hands and seals this 20th day of September, 1876.

EMILE SIRRET. [L. S.]
EMILE G. SIRRET. [L. S.]

Witnesses:
CHAS. J. CHRETIEN,
AMOS B. TANNER.